Sept. 9, 1952  G. KAST  2,609,965
ELECTRONIC CONTROL FOR GRAVIMETRIC FEEDERS
Filed Nov. 30, 1949
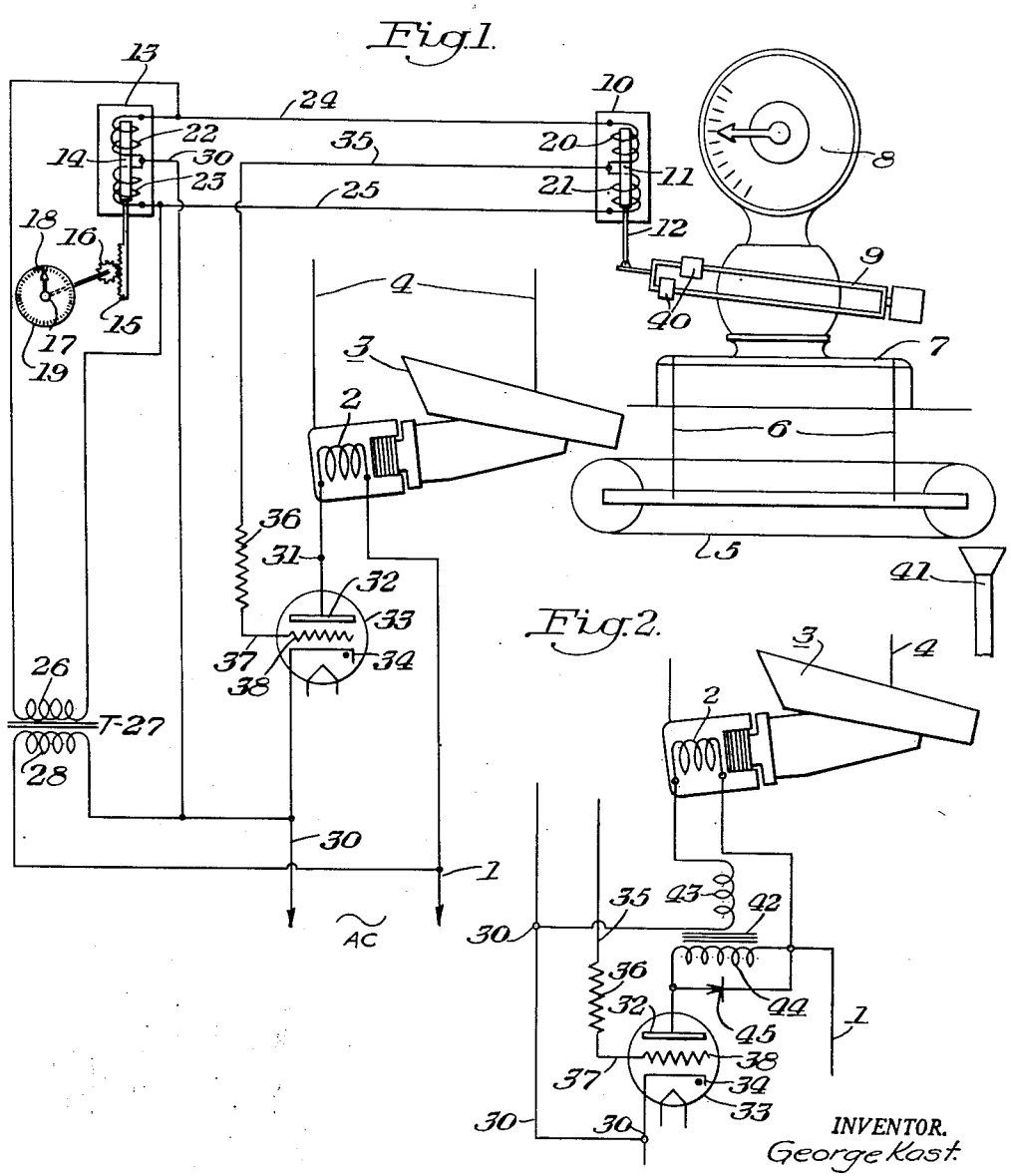
INVENTOR.
George Kast.
BY William D. Carothers
His Attorney Patented Sept. 9, 1952

2,609,965

UNITED STATES PATENT OFFICE 2,609,965

ELECTRONIC CONTROL FOR GRAVIMETRIC FEEDERS

George Kast, Homer City, Pa., assignor to Syntron Company, Homer City, Pa., a corporation of Delaware Application November 30, 1949, Serial No. 130,317

3 Claims. (Cl. 222—55)

This invention relates generally to electronic control circuits and more particularly to an electronic control circuit for a gravimetric feeder.

A gravimetric feeder is a machine for accurately weighing and feeding granular material continuously and consists of a vibratory conveyor that supplies material to a synchronously operating belt conveyor which is supported on a weighing device. The rate of feed of the vibratory feeder is automatically controlled by the load on the scale-suspended constant speed conveyor belt. Any variation of the weight or load on the belt conveyor varies the current supplied to the vibratory feeder which in turn corrects the amount of material supplied to the constant speed belt and thus maintains an accurate feed of continuously flowing material.

The object of this invention is the provision of a new and improved control circuit for the vibratory conveyor of a gravimetric feeder. These vibratory conveyors are preferably operated on pulsating current obtained from a rectified alternating current. In this invention the rectified current pulsations are obtained from a triode, such as a grid controlled thyratron, the control grid of which is fed from a bridge circuit made up of two inductive transducers, excited by the alternating current supply and varied by the weight of the material on the constant speed conveyor belt.

This bridge control circuit employs one of the inductive transducers as the manual means to set the desired rate of flow which manual means may be remote of the gravimetric feeder.

Any variation in weight of the material on the constant speed conveyor or from the selected weight of material causes the beam to move the core of one of the inductive transducers, which electrically varies the bridge circuit and shifts the phase of the voltage in the output circuit to the control grid of the thyratron with respect to the anode voltage. This control circuit thus functions to shift the phase of the control grid voltage to the thyratron which changes the magnitude of the current supplied to the vibratory conveyor. This increases or decreases the flow of material per unit of time from the vibratory conveyor to the constant speed conveyor for the purpose of correcting any weight inaccuracy detected by the weighing device. The variation in the phase relation of the grid voltage to the plate voltage is extremely great near the balance point of the bridge circuit. In other words, a small movement of the iron core in the inductive transducer produced by the movement of the beam balance will result in a phase reversal of 180° from one side of the balance point to the other. Such a change is proportional to the displacement of the iron core relative to the balance point. The phase angle may vary within a small range of movement of the beam from the "in phase position" to "180° out of phase position" or lagging with respect to the plate voltage. Since the amount of current passed by the thyratron to the vibratory conveyor is a function on the phase of its grid voltage, with respect to its anode voltage, the current passed by the thyratron will be a function of the position of the iron core in the inductive transducer actuated by the weighing device with respect to the iron core in the other inductive transducer that is manually positioned to provide a correct feed of material.

The degree of sensitivity of the system may be changed by varying the mechanical ratio between the scale deflection and transducer core movement. By this means, the feeding characteristic of the vibratory feeder can be changed from a practically steady flow, with gradual correction, to a cyclically varying flow of over rate of feed and under rate of feed to result in a very accurate average of the material supplied.

Another object of this invention resides in the simplicity of this control circuit and the relatively few number of elements required to perform an improved and more accurate control for the gravimetric feeder.

Other objects and advantages appear hereinafter in the following description and claims.

The accompanying drawings show, for the purpose of exemplification without limiting the claims thereto, certain practical embodiments of this invention wherein the view shown is a schematic diagram illustrating the electronic control circuit comprising this invention wherein:

Fig. 1 is a complete circuit diagram of the feeder control circuit with the thyratron directly supplying the operating current for the feeder; and Fig. 2 is a partial circuit diagram showing the thyratron functioning.

Referring to the drawing, one side of the alternating current supply is connected by the line 1 to one end of the electromagnetic motor 2 of the vibratory conveyor 3 suspended in the air by the lines 4. The top of the vibratory conveyor 3 is arranged to receive material from a suitable source such as a hopper, not shown, and supply the same to the synchronous belt conveyor 5 that is suspended by means of the members 6 from the weighing scale platform 7. The weighing scale is provided with the dial 8 and the poise balance arm 9, one end of which is arranged to operate the inductive type transducer 10 by moving the iron core 11 longitudinally therein, the core 11 being connected to the end of the beam 9 by means of the link 12.

The other inductive type transducer 13 is also provided with a magnetic core 14 having attached at one end the rack member 15 which is engaged by the gear member 16 that may be rotated manually by the handle 17 which has an indicator 18 thereon for the purpose of visually indicating the amount of material to be fed per unit of time on the scale 19.

Each of the inductive transducers 10 and 13 has two windings or they may be represented as a single winding with a center tap. However, as shown, the windings 20 and 21 of the transducer 10 are connected in the bridge circuit with the windings 22 and 23 of the transducer 13. The corresponding ends of the coils 20 and 22 are connected by the conductor 24 and the corresponding ends of the coils 21 and 23 are connected by the conductor 25, thus completing the bridge circuit. The adjacent ends of the coils 20 and 21 are connected together and the adjacent ends of the coils 22 and 23 are likewise connected together or this point of common connection may be considered a center tap of a single winding as previously stated.

The conductors 24 and 25 are likewise connected to the opposite ends of the secondary 26 of the exciting transformer 27, the primary 28 of which is connected to the alternating current supply as indicated by the conductors 1 and 30.

The alternating current supply is connected by the conductor 1 to one side of the coil 2 and the other side of the coil 2 is connected by the conductor 31 to the anode 32 of the thyratron 33. The cathode 34 of the thyratron 33 is connected to the other side of the A. C. supply line by the conductor 30. The conductor 30 also is connected to the midpoint between windings 22 and 23 of the transducer 13.

The midpoint of the coils 20 and 21 is connected by the conductor 35 to the resistance 36 and the conductor 37 to the grid 38 of the thyratron 33. The resistor 36 merely limits the current flowing in the grid circuit.

When the knob 17 is manually adjusted to position the core 14 in the transducer 13 at a selected position to provide a specific feed by the gravimetric feeder, the bridge circuit will require the iron core 11 of the transducer 10 to be positioned to a certain point to result in a balance condition of the system; that is, for the magnitude of the current through the electromagnetic motor 2 to be of the value required to maintain the specific rate of feed to the synchronous belt conveyor 5.

Since the iron core 11 is positioned by the movement of the beam 9, whose movement is proportional to the rate of material discharge from the vibratory conveyor 3, the position of core 11 will therefore be determined by the rate of feed from the vibratory conveyor 3. The output of the bridge circuit in conductors 30 and 35 will control the operation of electromagnetic motor 2 of the vibratory conveyor 3 and thus supply material at a given rate to the synchronous conveyor 5 which delivers the material to a discharge member 41. If the material fed to the synchronous operating belt conveyor 5 is under or over the rate which will keep the system balanced as determined by the position of core 11 relative to the set position of core 14, the rate of feed from the vibratory conveyor 3 will be automatically increased or decreased to cause the scale beam 9 to position core 11 to such a point where a balance of the system will be maintained.

Thus, the voltage on the grid 38 may shift in phase relative to the voltage on the plate 32, and this phase relationship will control the magnitude of the current passed by the grid controlled rectifier 33, and thus control the operation of the electromagnetic motor 2 of the vibratory conveyor 3.

Since the iron core 11 of the transducer 10 is free to follow the beam 9 of the scale 8 and the magnetic core 14 of the transducer 13 is positioned manually by some means such as a rack and pinion controlled by the knob, the phase of the output voltage of the grid circuit will be a function of the relative positions of these iron cores 11 and 14. The variation in phase is extremely great near the point of balance of the bridge; that is, a small movement of the beam about the balance position will cause a phase reversal of 180° from one side of the electrical balance point to the other, thereby providing a quick and positive control through the grid voltage in the operation of the thyratron and thus controlling the operation of the electromagnetic motor 2 of the vibratory conveyor 3.

Since the amount of the current passed by the thyratron 33 is a function of the phase of the grid voltage with respect to the anode voltage, the current passed by the thyratron will be a function of the position of the core 11 with respect to the core 14 in the inductive transducers 10 and 13, respectively. If the phase of the grid voltage is made to vary from in-phase to 180° lagging with respect to the anode voltage, corresponding to the movement of the scale beam 9 from an underweight to an overweight about a selected point on the scale, then likewise the output of the vibratory conveyor 3 will be increased if the scale is underweight and will be decreased if the scale is overweight. Because of this characteristic, this circuit provides a means for selecting a desired rate of feed merely by adjusting the position of the iron core 14 of the transducer 13. The current through the electromagnetic motor 2 of the vibratory conveyor 3 will automatically adjust itself to the correct value to maintain the desired rate of feed of material to the synchronous conveyor 5. Should the change in density of the material being fed, or some other condition result in a new current requirement to maintain the specific rate of feed, then, within a small movement of the beam, the new current magnitude will automatically be obtained, which will again result in a balance of the system and a constant rate of feed from the gravimetric feeder.

In Fig. 2, the electromagnetic motor 2 of the vibratory feeder conveyor 3 is operated by alternating current supplied directly from the line and the current is controlled by the saturable reactor 42 having two windings 43 and 44 on a single core. The winding 43 is connected in series with the motor 2 across the source of alternating current supply designated by 1 and 30. The winding 44 is connected from the plate 32 to the alternating current supply line 1 and has a rectifier, such as the dry disc rectifier 45 connected in multiple therewith. The low resistance path to the flow of current of the rectifier 45 is in the direction from the plate 32 to the line 1.

Variation of the current to the motor 2 will result from an impedance change of the saturable reactor 42 produced by flux saturation of its iron core in accordance with the control voltage of the transducer bridge circuit.

The magnitude of the current flowing through the control coil is a function of the relative positions of the transducer cores. The direct current component of the controlled rectified current is utilized to magnetically saturate the saturable reactor core. The use of the back rectifier 45 sustains the control current flowing during the negative half of the alternating current cycle and thereby results in a higher average direct current flow than would be obtained without it. The flux saturation varies in accordance with the variation of the direct current flowing through the winding 44 and the impedance of the winding 43 varies proportionately to the flux saturation of the core. Thus, a control of the impedance of the winding 43 determines the magnitude of the alternating current flowing through the motor 2 as a function of the weight of material on the weighing device and the same automatic control will prevail.

I claim:

1. A control circuit for a gravimetric feeder having a vibratory conveyor supplying a constant speed conveyor mounted on a weighing device comprising a motor for said vibratory conveyor, a pair of inductive transducers having coils and movable magnetic cores, said coils being connected in multiple with each other and with a circuit for supplying an alternating current excitation thereto, one of said magnetic cores connected to a movable member of said weighing device and the other connected to a manually positioning member, a triode having its anode and cathode connected in series with the motor of the vibratory conveyor, and connections intermediate said coils to form an output bridge connected to the grid and cathode of the triode to control the operation of said motor.

2. A control circuit for a gravimetric feeder having a vibratory conveyor supplying a constant speed conveyor mounted on a weighing device, comprising a motor for said vibratory conveyor, a pair of inductive transducers having coils with movable magnetic cores, said coils being connected in multiple with each other and with a secondary circuit of a transformer for supplying an alternating excitation current thereto, one of said magnetic cores connected to a movable part on said weighing device and the other being manually adjustable to a selected position corresponding to a desired weight of material to be fed per unit of time, a triode having its anode and cathode connected in series with the motor of the vibratory conveyor, and connections intermediate said coils to form an output bridge circuit, the coil connection from the manually operated transducer being connected to said cathode and the other coil connection being made through a resistor to the grid of said triode to change the operation of said motor upon weight changes effective in the movement of the core connected to the weighing device.

3. A control circuit for a gravimetric feeder having a vibratory conveyor supplying a constant speed conveyor mounted on a weighing device comprising a motor for said vibratory conveyor, a pair of inductive transducers having coils and movable magnetic cores, said coils being connected in multiple with each other and with a circuit for supplying an alternating current excitation thereto, one of said magnetic cores connected to a movable member of said weighing device and the other connected to a manually positioning member, a saturable reactor having two windings on a core, a thyratron having its anode and cathode connected in series with one of the windings of said reactor and across an alternating current supply, a connection placing the other winding of said reactor in series with the motor of the vibratory conveyor and across the alternating current supply, and connections intermediate said coils to form an output bridge circuit connected to the grid and cathode of the thyratron to control the operation of said motor.

GEORGE KAST.

REFERENCES CITED

The following references are of record in the file of this patent:

UNITED STATES PATENTS

| Number | Name | Date |
|---|---|---|
| 2,276,383 | Francis | Mar. 17, 1942 |
| 2,366,415 | Lindsay | Jan. 2, 1945 |